US012687835B2

(12) United States Patent
Yura

(10) Patent No.: US 12,687,835 B2
(45) Date of Patent: Jul. 21, 2026

(54) SERVO SYSTEM

(71) Applicant: OKUMA Corporation, Niwa-gun (JP)

(72) Inventor: Motozumi Yura, Niwa-gun (JP)

(73) Assignee: OKUMA CORPORATION, Niwa-Gun (JP)

( * ) Notice: Subject to any disclaimer, the term of this patent is extended or adjusted under 35 U.S.C. 154(b) by 155 days.

(21) Appl. No.: 18/606,555

(22) Filed: Mar. 15, 2024

(65) Prior Publication Data

US 2024/0310811 A1     Sep. 19, 2024

(30) Foreign Application Priority Data

Mar. 16, 2023     (JP) ................................. 2023-042274

(51) Int. Cl.
*G05B 19/4063*         (2006.01)

(52) U.S. Cl.
CPC .................... *G05B 19/4063* (2013.01); *G05B 2219/41293* (2013.01); *G05B 2219/50083* (2013.01)

(58) Field of Classification Search
CPC ...... G05B 19/4063; G05B 2219/41293; G05B 2219/50083; H02P 5/74; H02P 27/06
USPC ........................................ 318/565, 563, 560
See application file for complete search history.

(56) References Cited

U.S. PATENT DOCUMENTS

| | | | | |
|---|---|---|---|---|
| 6,194,856 B1 * | 2/2001 | Kobayashi | ........ | H02M 7/53873 388/903 |
| 8,030,878 B2 * | 10/2011 | Iwashita | ................ | G01R 31/42 318/779 |
| 10,720,872 B2 * | 7/2020 | Tanaka | .................... | H02P 27/08 |
| 2014/0132194 A1 | 5/2014 | Okita et al. | | |
| 2018/0046171 A1 | 2/2018 | Sapir et al. | | |

FOREIGN PATENT DOCUMENTS

| | | |
|---|---|---|
| JP | 2001238490 A | 8/2001 |
| JP | 2003348892 A | 12/2003 |
| JP | 2012223054 A | 11/2012 |
| JP | 2014096929 A | 5/2014 |
| JP | 2014241728 A | 12/2014 |
| JP | 2022141529 A | 9/2022 |

OTHER PUBLICATIONS

JPO Notice of Reasons for Refusal for corresponding JP Application No. 2023-042274; issued Nov. 25, 2025.

* cited by examiner

*Primary Examiner* — David Luo
(74) *Attorney, Agent, or Firm* — CANTOR COLBURN LLP

(57)         ABSTRACT
A servo unit includes a main controller, inverter units configured to control different motors in accordance with a command from the main controller, and a power unit that is configured to supply direct current power to each of the inverter units and that is communicable with the inverter units in parallel. The inverter units include a single key inverter unit. The main controller and the power unit communicate with each other via the key inverter unit that is a relay. The power unit controls power supply based on a power source control command transmitted from the main controller.

2 Claims, 4 Drawing Sheets

SERVO SYSTEM

CROSS REFERENCE TO RELATED APPLICATIONS

The present invention claims priority under 35 U.S.C. § 119 to Japanese Application No. 2023-042274 filed Mar. 16, 2023, the entire content of which is incorporated herein by reference.

TECHNICAL FIELD

The present specification discloses a servo system configured to control a feed axis motor that drives a feed axis of a machine tool and a main spindle motor that drives a main spindle.

BACKGROUND

In a servo system for a machine tool, commands from an NC apparatus or main controller to inverter units typically include a motor position command, a speed command, and a torque command, for example, and responses from the inverter units to the NC apparatus typically include a motor position detection value and a speed detection value, for example. To achieve high-precision machine control with these commands and responses, high-speed and large capacity communication interfaces are employed. Specifically, communication of approximately 10 to 100 Mbps based on the Ethernet technology is employed, for example.

Meanwhile, in order to stop the machine immediately in the event of occurrence of power failure, for example, to thereby prevent damage to the machine, communication between the inverter units and the power unit is typically performed by 1 to N communication (where N is the number of inverter units), in which data are transmitted from the power unit to a plurality of inverter units simultaneously. Conventionally, only an error of the inverters is transmitted from the inverter units to the power unit by using a hard wire signal; therefore, one-way communication is typically employed between the inverter units and the power unit. Here, data to be communicated include data of the control state of the power unit or DC voltage values output from the power unit, for example, which have a rather small data capacity. A specific example communication interface performs communication of approximately 10 to 100 kbps using RS485.

FIG. 3 illustrates a configuration of a typical conventional servo system. A power unit 1 converts alternating current (AC) power to a direct current power and supplies the direct current power to inverter units 2a, 2b, and 2c. The inverter units 2a, 2b, and 2c receive a position command, a speed command, and a torque command, for example, from an NC apparatus 3 or main controller, via communication interfaces 4a, 4b, and 4c, respectively, to control a feed axis motor and a main spindle motor in accordance with these commands. The communication interfaces 4a, 4b, and 4c perform bidirectional communication for transmitting position detection values and speed detection values, for example, from the corresponding inverter units 2a, 2b, and 2c to the NC apparatus (main controller). While FIG. 3 illustrates a daisy chain, a bus connection may also be used. According to the bus connection, the NC apparatus 3 and the inverter units 2a, 2b, and 2c perform bidirectional communication by using a communication path in a time-division manner.

To control the electric current of the feed axis motor and the main spindle motor, the inverter units 2a, 2b, and 2c require DC voltage information output from the power unit 1. The power unit 1 therefore transmits DC voltage values to the inverter units 2a, 2b, and 2c via a communication interface 5. The DC voltage values are received via communication interfaces 6a, 6b, and 6c of the respective inverter units. The communication interfaces 6a, 6b, and 6c perform only receiving operation.

In the event of occurrence of power failure, the power unit 1 transmits a power failure signal (not shown) that is detected, via the communication interface 5, to the inverter units 2a, 2b, and 2c. The inverter units 2a, 2b, and 2c, receiving the power failure signal simultaneously, stop each motor immediately to thereby prevent damages to the machine.

To achieve energy saving, there has been a demand for high-performance power control of the entire servo system, and therefore variable control of the power unit in accordance with commands from the NC apparatus or main controller is being demanded. For example, when the load or required power for the entire machine is small, the DC voltage to be supplied to the inverter units is lowered to reduce loss of the inverters. However, the configuration illustrated in FIG. 3, which allows only one-way communication from the power unit 1 to the inverter units 2a, 2b, and 2c and does not therefore allow the power unit 1 to receive communication from the inverter units 2a, 2b, and 2c, fails to achieve variable control of the power unit 1.

To achieve variable control of the power unit, JP 2003-348892 A and JP 2014-096929 A disclose that a power unit and inverter units are connected via an identical network and that a high-performance bidirectional communication interface that is equivalent to that of the inverter units is employed for communication of the power unit.

FIG. 4 illustrates a configuration of a servo system disclosed in JP 2003-348892 A or JP 2014-096929 A. A power unit 1 converts alternating current (AC) power into direct current power and supplies the direct current power to inverter units 2a, 2b, and 2c. The inverter units 2a, 2b, and 2c receive, from an NC apparatus 3 or main controller, a position command, a speed command, and a torque command, for example, via bus-connection bidirectional communication interfaces 4a, 4b, and 4c, respectively, to control a feed axis motor and a main spindle motor in accordance with these commands.

A communication interface 5 disposed in the power unit 1 differs from the communication interface 5 in the example illustrated in FIG. 3, in that the communication interface 5 in FIG. 4 has an equivalent performance to and is connected in the same line as the communication interfaces 4a, 4b, and 4c of the inverter units. The NC apparatus 3 transmits commands to the inverter units and similarly transmits commands to the power unit 1 and performs various functions. The configuration illustrated in FIG. 4 requires high-performance bidirectional communication for the power unit 1, leading to a cost increase.

An embodiment of the disclosure is therefore aimed toward providing a servo system capable of variably controlling the power unit in accordance with a command from a main controller.

SUMMARY

A servo system disclosed in the specification includes a main controller; a plurality of inverter units configured to control different motors in accordance with a command from the main controller; and a power unit that is configured to supply direct current (DC) power to each of the plurality of inverter units and that is communicable with the plurality of inverter units in parallel. The plurality of inverter units include a single key inverter unit. The main controller and the power unit communicate with each other via the key inverter unit. The power unit controls power supply based on a power source control command transmitted from the main controller.

This configuration provides a servo system that variably controls the power unit with an inexpensive communication interface in accordance with a command from the main controller.

In this configuration, the main controller may include a control circuit including a communication interface. Each of the inverter units may include a control circuit including a first communication interface for communication with the main controller, a second communication interface for communication with the power unit, and an ID number holder prestoring specific ID numbers, and an inverter. The power unit may include a control circuit including a communication interface for communication with the plurality of inverter units, and a power conversion circuit. The control circuit of the power unit may be configured to repeat simultaneous transmission of a calling number to the plurality of inverter units while changing the calling number sequentially from a predetermined initial value to a predetermined final value; temporarily store one or more presence numbers, each of the presence numbers corresponding to the calling number in response to reception of which one of the inverter units transmits a predetermined response; identify one of the one or more presence numbers as a key unit ID number; and determine, as the key inverter unit, one of the inverter units that transmits the predetermined response to the calling number that matches the key unit ID number, and transmit the key unit ID number to the plurality of inverter units. The control circuit of each inverter unit may be configured to, in response to reception of the calling number, from the power unit, matching the ID number stored in the ID number holder, transmit the predetermined response to the power unit; in response to reception of the key unit ID number, from the power unit, matching the ID number stored in the ID number holder, transmit identification information of the inverter unit, as key unit information, to the main controller; and in response to reception of the power source control command from the main controller, transmit the power source control command to the power unit.

This configuration enables the main controller to specify the key inverter unit in response to a change of a combination of the power unit and the inverter unit. This eliminates the need for a complicated configuration that allows the main controller to specify the key inverter unit, thereby simplifying the configuration of the main controller.

The communication interface of the power unit that is a primary communication interface and the second communication interface of each inverter unit that is a secondary communication interface may be connected via a bus. The plurality of inverter units may receive signals transmitted from the power unit substantially simultaneously. The communication interface of the main controller and the first communication interface of each inverter unit may be connected through daisy chaining.

The technology disclosed in the specification provides a servo system that variably controls a power unit with an inexpensive communication interface in accordance with a command from a main controller.

BRIEF DESCRIPTION OF DRAWINGS

An embodiment of the present disclosure will be described based on the following figures, wherein.

DESCRIPTION OF EMBODIMENTS

Figure 1:
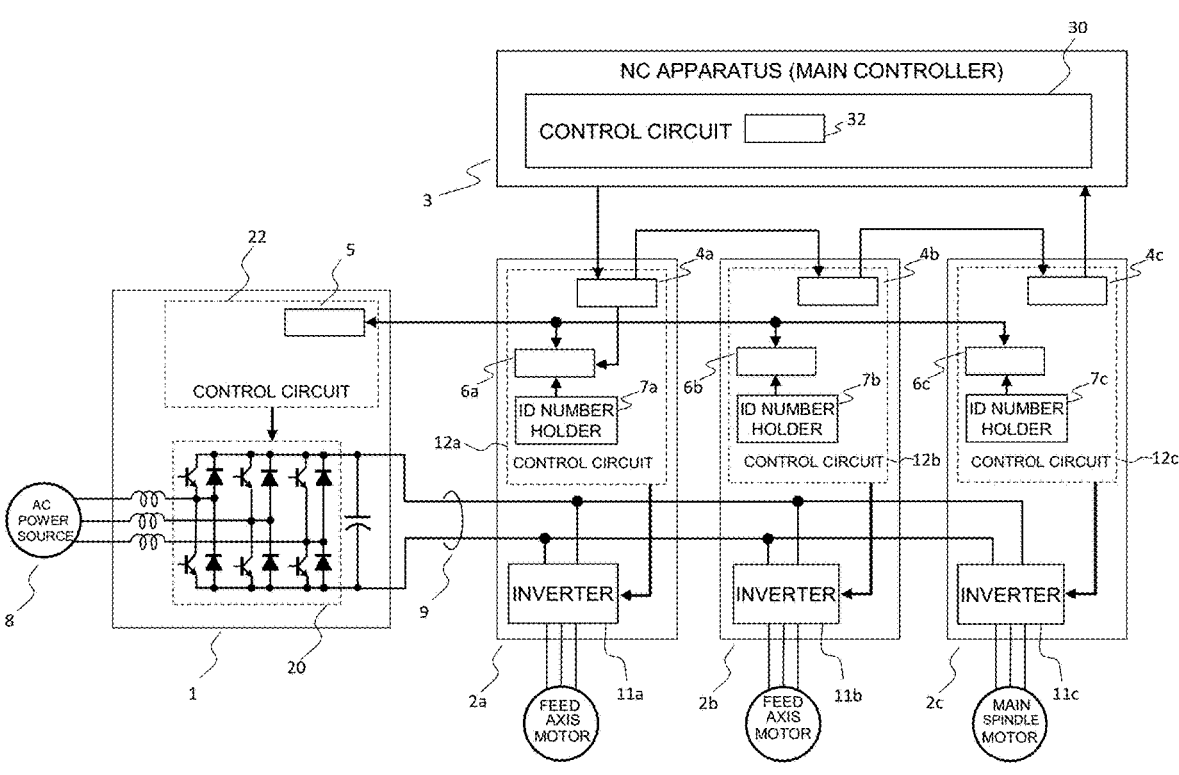
FIG. 1 illustrates a configuration of a servo system.

FIG. 1 illustrates the configuration of a servo system. A power unit 1 converts alternating current (AC) power supplied from an alternating current power source 8 into direct current (DC) power and supplies the direct current (DC) power to inverter units 2a, 2b, and 2c via a DC link 9. In the following description, each of the inverter units 2a, 2b, and 2c will be simply referred to as an "inverter unit 2", unless the individual inverter units need to be distinguished from each other. Elements of each inverter unit 2 will be referred to in a similar manner. Further, while the illustrated example includes three inverter units 2 for simplification of description, the number of inverter units 2 is not limited to this example and may be any number to the upper limit that is the maximum number determined by hardware restriction. In the following description, the upper limit is N.

At the time of deceleration of the main spindle motor and the feed axis motor, the kinetic energy is regenerated as electric power; therefore, a power conversion circuit 20 within the power unit 1 functions as a reversible convertible inverter. It is therefore possible to variably control the DC voltage of the DC link 9 as desired by controlling this inverter; that is, the power conversion circuit 20. The power unit 1 further includes, in addition to the power conversion circuit 20, a control circuit 22. The control circuit 22 is a computer having, for example, a processor (not shown), a memory (not shown), and a communication interface 5.

The plurality of inverter units 2a, 2b, and 2c receive a position command, a speed command, and a torque command, for example, for the feed axis motor and the main spindle motor, via daisy chaining communication interfaces 4a, 4b, and 4c, respectively, from an NC apparatus 3 to control these motors. The communication interfaces 4a, 4b, and 4c correspond to a first communication interface for communicating with the NC apparatus 3 or main controller.

The inverter unit 2 includes an inverter 11 and a control circuit 12. The control circuit 12 includes two types of communication interfaces 4 and 6, and an ID number holder 7. The ID number holder 7 stores and holds specific ID numbers which are to be referenced for identifying a command target in communication with the NC apparatus 3. The control circuit 12 is configured by a computer including, for example, a processor, a memory, and a communication interface.

The NC apparatus 3 or main controller includes a control circuit 30 having a communication interface 32. The control circuit 30 is a computer including, for example, a processor (not shown), a memory (not shown), and the communication interface 32.

A servo system that controls a machine tool needs to stop the control of the feed axis and the main spindle as soon as possible at the time of failure of the alternating current power source, such as power failure, to prevent faults such as damage to a machine. To this end, the power unit 1 continuously monitors the voltage of the alternating current power source 8, and in response to detection of failure, transmits a power failure signal, via the communication interface 5, to the communication interface 6 of the inverter unit 2. The communication interfaces 5 and 6 establish bus connection, with the communication interface 5 being a bus-master interface and the communication interface 6 being a bus-slave interface. The communication interfaces 6 correspond to a second communication interface for communicating with the power unit 1. The communication interfaces 6 of the inverter units 2 receive the power failure signal at the same time. The control circuit 12, upon receiving the power failure signal, immediately executes processing to stop each motor.

In this system, one of the inverter units 2 is designated as a key inverter unit according to the processing described below. To provide commands such as change of the DC voltage and change of control parameters from the NC apparatus 3 to the power unit 1, the NC apparatus 3 identifies a key inverter unit according to the processing described below and transmits a command for the power unit 1 to the key inverter unit. In the example illustrated in FIG. 1, the inverter unit 2a is a key inverter unit. The command from the NC apparatus 3 is transmitted to the key inverter unit 2a via the communication interface 4a, relayed by the communication interface 6a, and received by the communication interface 5 of the power unit 1.

Figure 2:
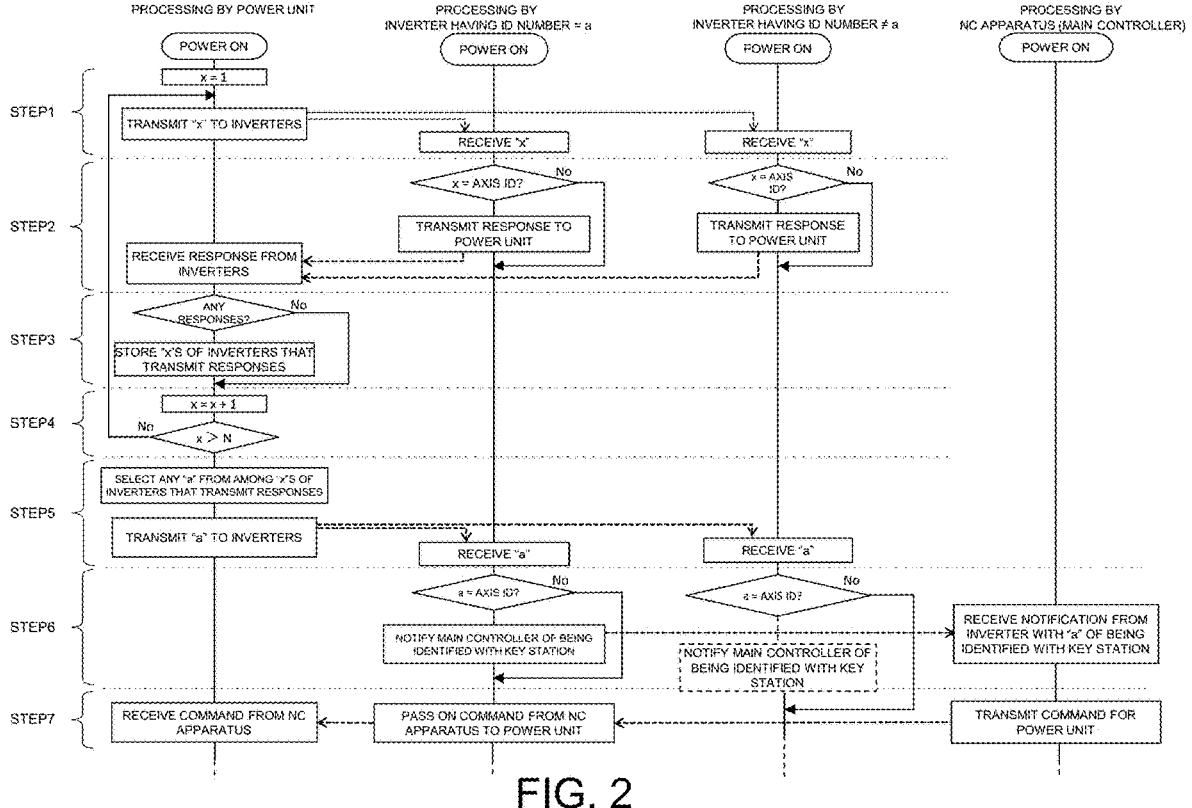
FIG. 2 is a flowchart showing process steps for establishing communication between a power unit and an NC apparatus.
Figure 3:
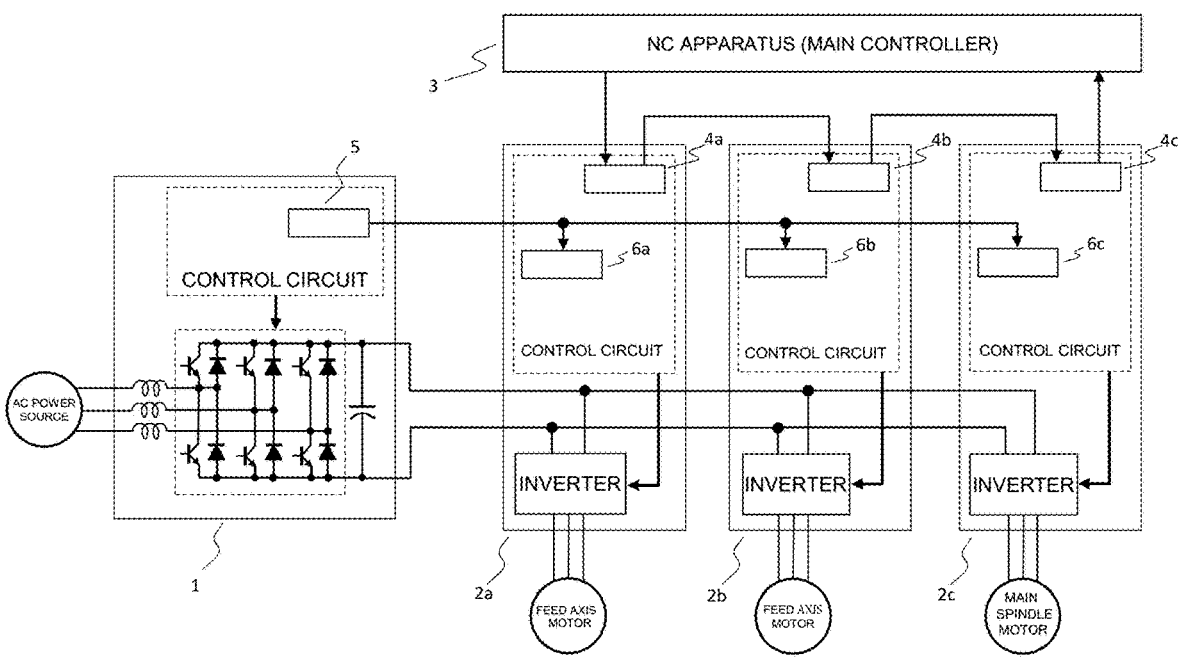
FIG. 3 illustrates an example configuration of a servo system according to a conventional technique.
Figure 4:
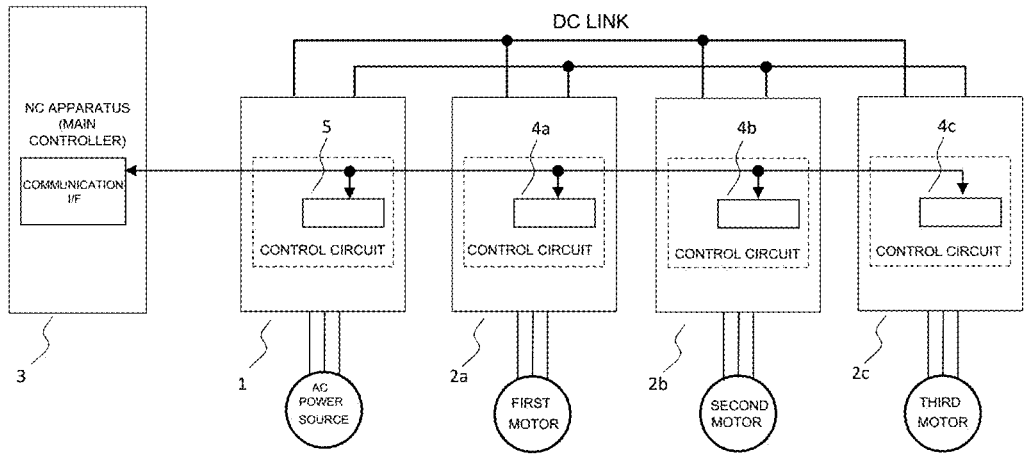
FIG. 4 illustrates another example configuration of a servo system according to a conventional technique.

The process steps for determining the key inverter unit and identifying the key inverter unit by the NC apparatus 3 will be described by reference to the flow chart illustrated in FIG. 2.
Step 0
The power unit 1 initializes a calling number x to x=1.
Step 1
Then, the power unit 1 transmits the calling number x to all of the inverter units 2. All of the inverter units 2 receive the calling number x transmitted from the power unit 1 at substantially the same time.
Step 2
The inverter unit 2 compares the calling number x that is received with a axis ID number stored in the ID number holder 7. When the calling number x matches the axis ID number, the inverter unit 2 transmits a predetermined response to the power unit 1. For example, the inverter unit having an ID number "a" transmits a predetermined response to the power unit 1 in response to reception of the calling number x=a.
Step 3
The power unit 1, receiving the predetermined response from the inverter unit 2 in response to the calling number x, stores the calling number x as a presence number.
Step 4
The power unit 1 increments the calling number x by one, and determines whether the calling number x exceeds the predetermined upper limit value N. In response to the determination result being x≤N, the processes in steps 1 to 3 are executed once again. In response to the determination result being x>N, the process proceeds to step 5. As such, the power unit 1 repeats the processes in steps 1 to 4 until the calling number x reaches the upper limit value N. Here, the upper value N corresponds to the maximum number of inverters that can be connected under hardware restrictions. While in this example, it is assumed that the initial value of the calling number x is 1, the initial value and the end value of the calling number x may be changed as appropriate. For example, the initial value of the calling number x may be the upper limit value N, which may be decremented one by one each time the sequence of processes in steps 1 to 4 is repeated.

Step 5
The power unit 1 selects, as a key unit ID number, any number from among the numbers stored in step 3 regarding the calling numbers 1 to N. In the example illustrated in FIG. 2, the power unit 1 selects the number "a" as the key unit ID number. Any method may be employed to select the key unit ID number. For example, the power unit 1 may select the smallest number as the key unit ID number, which eliminates the need for the power unit 1 to acquire preliminary information. The power unit 1 then transmits the selected key unit ID number to all of the inverter units 2. Specifically, in the example illustrated in FIG. 2, the power unit 1 transmits the specific number "a". All the inverter units 2 receive the key unit ID number "a" simultaneously.
Step 6
The inverter unit 2 determines whether the received key unit ID number "a" matches the axis ID number stored in the ID number holder 7. In response to the determination of the ID numbers being matched, the inverter unit 2 notifies the NC apparatus 3 that the inverter unit 2 is designated as the key inverter unit. In the example illustrated in FIG. 2, the inverter unit 2 having the ID number "a" notifies the NC apparatus 3 of its identification information as the key unit information, while other inverter units 2 having ID numbers other than "a" do not perform such notification. The NC apparatus 3, receiving the notification from the inverter unit 2 having the ID number "a", recognizes that the key inverter unit corresponds to the inverter unit 2 having the ID number "a".
Step 7
The NC apparatus 3 transmits a command or instruction for the power unit 1 (hereinafter referred to as a "power control command") to the inverter unit 2 having the ID number "a", which passes on the power control command to the power unit 1. The power unit 1 receives the relayed power control command from the NC apparatus 3. Similarly, responses from the power unit 1 to the NC apparatus 3 are relayed by the inverter unit 2 having the ID number "a" which is the key inverter unit, although not shown in FIG. 2.

Specific means that enables the ID number holder 7 to store the axis ID numbers may include a device that is manually set, such as a DIP switch, or a memory on the control circuit 12, for storing data previously input from the main controller or an external apparatus.

REFERENCE SIGN LIST

1 power unit, 2 inverter unit, 3 NC apparatus, 4 first communication interface of inverter unit, 5 communication interface of power unit, 6 second communication interface of inverter unit, 7 ID number holder, 8 alternating current power source, 9 DC link, 11 inverter, 12 control circuit of inverter unit, 20 power conversion circuit, 22 control circuit of power unit, 30 control circuit of main controller, 32 communication interface of main controller.

The invention claimed is:
1. A servo system comprising:
a main controller;
a plurality of inverter units configured to control different motors in accordance with a command from the main controller; and
a power unit configured to supply direct current (DC) power to each of the plurality of inverter units, the power unit being communicable with the plurality of inverter unit in parallel, wherein
the plurality of inverter units include a single key inverter unit,

US 12,687,835 B2

7 the main controller and the power unit communicate with
each other via the key inverter unit, and
the power unit controls power supply based on a power
source control command transmitted from the main
controller,
wherein
the main controller comprises a control circuit including
a communication interface,
each of the inverter units comprises a control circuit and
an inverter, the control circuit including a first com-
munication interface for communication with the main
controller, a second communication interface for com-
munication with the power unit, and an ID number
holder prestoring specific ID numbers,
the power unit comprises a control circuit including a
communication interface for communication with the
plurality of inverter units, and a power conversion
circuit,
the control circuit of the power unit is configured to:
  repeat simultaneous transmission of a calling number to
    the plurality of inverter units while changing the
    calling number sequentially from a predetermined
    initial value to a predetermined final value;
  temporarily store one or more presence numbers, each
    of the presence number corresponding to the calling
    number in response to reception of which one of the
    inverter units transmits a predetermined response;
  identify one of the one or more presence numbers as a
    key unit ID number and
  determine, as the key inverter unit, one of the inverter
    units that transmits the predetermined response in response to the calling number that matches the key
  unit ID number, and transmit the key unit ID number
  to the plurality of inverter units, and
the control circuit of each of the inverter units is config-
  ured to:
  in response to reception of the calling number, from the
    power unit, matching the ID number stored in the ID
    number holder, transmit the predetermined response
    to the power unit;
  in response to reception of the key unit ID number,
    from the power unit, matching the ID number stored
    in the ID number holder, transmit identification
    information of the inverter unit, as key unit infor-
    mation, to the main controller; and
  in response to reception of the power source control
    command from the main controller, transmit the
    power source control command to the power unit.
2. The servo system according to claim 1, wherein
the communication interface of the power unit that is a
  primary communication interface and the second com-
  munication interface of each of the plurality of inverter
  units that is a secondary communication interface are
  connected via a bus,
the plurality of inverter units receive signals transmitted
  from the power unit substantially simultaneously, and
the communication interface of the main controller and
  the first communication interface of each of the plu-
  rality of inverter units are connected through daisy
  chaining.

* * * * *